United States Patent
Christian

(10) Patent No.: US 7,889,943 B1
(45) Date of Patent: Feb. 15, 2011

(54) METHOD AND SYSTEM FOR CHARACTERIZING NOISE

(75) Inventor: James D. Christian, Austin, TX (US)

(73) Assignee: Picture Code, Austin, TX (US)

( * ) Notice: Subject to any disclaimer, the term of this patent is extended or adjusted under 35 U.S.C. 154(b) by 981 days.

(21) Appl. No.: 11/405,797

(22) Filed: Apr. 18, 2006

Related U.S. Application Data

(60) Provisional application No. 60/672,411, filed on Apr. 18, 2005.

(51) Int. Cl.
*G06K 9/40* (2006.01)

(52) U.S. Cl. ...................................................... 382/275

(58) Field of Classification Search .................. 382/275
See application file for complete search history.

(56) References Cited

U.S. PATENT DOCUMENTS

| | | | |
|---|---|---|---|
| 5,602,934 A | 2/1997 | Li | |
| 5,619,998 A | 4/1997 | Abdel-Malek | |
| 5,771,318 A | 6/1998 | Fang et al. | |
| 6,069,982 A | 5/2000 | Reuman | |
| 6,208,951 B1 | 3/2001 | Kumar | |
| 6,229,923 B1 | 5/2001 | Williams | |
| 6,256,403 B1 | 7/2001 | Florent et al. | |
| 6,741,739 B1 | 5/2004 | Vincent | |
| 6,847,737 B1 | 1/2005 | Kouri | |
| 7,426,464 B2 | 9/2008 | Hui | |
| 2002/0008771 A1* | 1/2002 | Uchino et al. | 348/362 |
| 2002/0034337 A1* | 3/2002 | Shekter | 382/275 |
| 2002/0041717 A1* | 4/2002 | Murata et al. | 382/275 |
| 2003/0035056 A1* | 2/2003 | Chen et al. | 348/273 |
| 2003/0079191 A1* | 4/2003 | Savithri et al. | 716/4 |
| 2003/0194150 A1* | 10/2003 | Berkner | 382/300 |
| 2003/0231798 A1* | 12/2003 | Jang | 382/240 |
| 2006/0029285 A1 | 2/2006 | Hein et al. | |

FOREIGN PATENT DOCUMENTS

| | | |
|---|---|---|
| GB | 2 272 285 A | 5/1994 |
| JP | 2003101784 | 4/2003 |
| JP | 2003101784 A * | 4/2003 |

OTHER PUBLICATIONS

Declaration of J. Christian, Feb. 9, 2010 in addition with Screen Prints for Noise Ninja and associated documents, 18 pgs. Nov. 7, 2003.*

(Continued)

*Primary Examiner*—John B Strege
*Assistant Examiner*—Nirav G Patel
(74) *Attorney, Agent, or Firm*—Sprinkle IP Law Group

(57) ABSTRACT

Embodiments of the present invention provide a method and system for characterizing noise in a set of data based on an analysis of subsets of the data. For example, noise for an image can be characterized based on analyzing selected regions of the image. The characterization of the noise can be stored in a data structure that models the noise as jointly dependent on values of multiple parameters (pixel values for multiple channels). The noise can be further characterized for one or more wavelet subbands of the set of data.

46 Claims, 7 Drawing Sheets

OTHER PUBLICATIONS

"Change Log", obtained from the internet at <<http://web.archive.org/web/20040806131333/www.picturecode.com>>, May 12, 2009; 3 pages.

"Digital files-noise removal software-Noise Ninja", obtained from the internet at <<http://web.archive.org/web/20040819182053/photography.about.com>>, May 12, 2009; 3 pages.

"News!—NoiseNinja 1.1 released!", obtained from <<http://web.archive.org/web/20040628013550/www.imaging-resource.com>>, May 12, 2009; 3 pages.

"Noise Ninja FAQ", obtained from the internet at <<http://web.archive.org/web/20031207091900/www.picturecode.com>>, May 12, 2009; 1 page.

"Noise Ninja FAQ", obtained from the internet at <<http://web.archive.org/web/20040607060154/www.picturecode.com>>, May 12, 2009; 1 page.

"Noise Ninja: Features, advantages, and differences", obtained from the Internet at <<http://web.archive.org/web/20031108063949/www.picturecode,com>>, May 12, 2009; 2 pages.

"Noise Ninja: Features, advantages, and differences", obtained from the internet at <<http://web.archive.org/web/20040607061610/www.picturecode.com>>, May 12, 2009; 2 pages.

"Noise Ninja: Understanding Noise", obtained from the internet at <<http://web.archive.org/web/20031108064152/www.picturecode.com>>, May 12, 2009; 2 pages.

"Noise Ninja: Understanding Noise", obtained from the internet at <<http://web.archive.org/web/20040607062207/www.picturecode.com>>, May 12, 2009; 2 pages.

"Noise Reduction Tool Comparison", obtained from the Internet at <<http://web.archive.org/web/20031205043059/www.michaelalmond.com>>, May 12, 2009; 2 pages.

"Noise Reduction Tool Comparison", obtained from the internet at <<http://web.archive.org/web/20031206184309/www.michaelalmond.com>>, May 12, 2009; 2 pages.

"PictureCode home page", obtained from the internet at <<http://web.archive.org/web/20040615095551/http://www.picturecode.com>>, May 12, 2009; 2 pages.

"PictureCode home page", obtained from the internet at <<http://web.archive.org/web/20040405184611/http://www.picturecode.com>>, May 12, 2009; 1 page.

"PictureCode home page", obtained from the internet at <<http://web.archive.org/web/20031124210205/http://www.picturecode.com>>, May 12, 2009; 1 page.

"PictureCode home page", obtained from the internet at <<http://web.archive.org/web/20031107051142/http://www.picturecode.com>>, May 12, 2009; 1 page.

"PictureCode: Downloads", obtained from the internet at <<http://web.archive.org/web/20031108070427/www.picturecode.com>>, May 12, 2009; 2 pages.

"PictureCode: Downloads", obtained from the internet at <<http://web.archive.org/web/20031207084954/www.picturecode.com>>, May 12, 2009; 2 pages.

"PictureCode: Downloads", obtained from the internet at <<http://web.archive.org/web/20040607051328/www.picturecode.com>>, May 12, 2009; 2 pages.

"PictureCode: Online store", obtained from the internet at <<http://web.archive.org/web/20031108065053/www.picturecode.com>>, May 12, 2009; 1 page.

"PictureCode: Online store", obtained from the internet at <<http://web.archive.org/web/20040607063645/www.picturecode.com>>, May 12, 2009; 1 page.

"PictureCode: Reviews and testimonials", obtained from the internet at <<http://web.archive.org/web/20031118172841/www.picturecode.com>>, May 12, 2009; 1 page.

"PictureCode: Reviews and testimonials", obtained from the internet at <<http://web.archive.org/web/20040214001632/www.picturecode.com>>, May 12, 2009; 1 page.

"PictureCode: Reviews and testimonials", obtained from the internet at <<http://web.archive.org/web/20040622021409/www.picturecode.com>>, May 12, 2009; 1 page.

"Rob Galbraith DPI: Noise Ninja v2.0 for Mac and . . . ", obtained from the internet at <<http://web.archive.org/web/20040614144304/www.robgalbraith.com>>, May 12, 2009; 4 pages.

"Rob Galbraith DPI: Noise Ninja v2.0 for Mac and . . . ", obtained from the internet at <<http://web.archive.org/web/20040924080759/www.robgalbraith.com>>, May 12, 2009; 4 pages.

"PictureCode: Update log for downloads", obtained from the internet at <<http://www.picturecode.com/update_log.htm>, May 12, 2009; 2 pages.

"PictureCode: Update log for downloads", obtained from the internet at <<http://www.web.archive.org/web/20031118192520/www.picturecode.com>>, May 12, 2009; 1 page.

"PictureCode: Update log for downloads", obtained from the internet at <<http://web.archive.org/web/20040605211236/www.picturecode.com>>, May 12, 2009; 2 pages.

"Workflow Technique #025 @Digital Outback Photo", obtained from the internet at <<http://web.archive.org/web/20031119051008/www.outbackphoto.com>>, May 12, 2009; 11 pages.

Office Action for U.S. Appl. No. 11/472,169, dated Jul. 17, 2009, 17 pgs.

Hsu, "Extracting Target Features from Angle-Angle and Range-Doppler Images", The Lincoln Laboratory Journal, vol. 6, No. 1, 1993, pp. 213-227.

Office Action for U.S. Appl. No. 11/472,174, dated Aug. 4, 2009, 22 pgs.

Office Action for U.S. Appl. No. 11/472,183 mailed Nov. 4, 2009.

Linda Shapiro and George Stockman, Computer Vision, Prentice Hall, 2001.

Wikipedia, Article on Rotational Symmetry, at http://en.wikipedia.org/wiki/Rotational_symmetry, downloaded on Sep. 16, 2009, 5 pgs.

Wikipedia, Article on Reflection Symmetry, http://en.wikipedia.org/wiki/Reflection_symmetry, downloaded on Sep. 16, 2009, 2 pgs.

Office Action for U.S. Appl. No. 11/471,918 mailed Dec. 9, 2009, 7 pgs.

Abhayaratne, "2D Wavelet Transforms With a Spatially Adaptive 2D Low Pass Filter," Proceedings of the 6th Nordic Signal Processing Symposium, Jun. 9-11, 2004, Norsig 2004, 5 pgs.

Sakellaropoulos et al, "A wavelet-based spatially adaptive method for mammographic contrast enhancement," Institute of Physics Publishing, Physics in Medicine and Biology, 2003, pp. 787-803.

Declaration of J. Christian, for U.S. Appl. No. 11/405,797, Feb. 9, 2010, 1 pg.

"Main Page" from Picturecode, 24 pages, obtained from internet <<http://picturecode.com/wiki/index.php/Main_Page>> on Feb. 2, 2009.

"PictureCode: News and events—What's happening at PictureCode" from PictureCode, 4 pages, obtained from internet <<http://picturecode.com/news/htm>> on Feb. 2, 2009.

"PictureCode: Change log for the plug-in version of Noise Ninja" from PictureCode, 3 pages, obtained from internet <<http://picturecode.com/change_log2.htm>> on Feb. 2, 2009.

"PictureCode: The five-minute guide to Noise Ninja 2" from PictureCode, 5 pages, obtained from internet <<http://picturecode.com/docs/nnstandalone>> on Feb. 2, 2009.

Li and Orchard, "Spatially Adaptive Image Denoising Under Overcomplete Expansion", 2000 IEEE, Dept. of Electrical Engineering, Princeton University, pp. 300-303.

Simoncelli and Adelson, "Noise Removal via Bayesian Wavelet Coring," Proceedings of $3^{rd}$ IEEE International Conference on Image Processing. vol. 1, pp. 379-382, Sep. 16-19, 1996.

Chang, "Spatially Adaptive Wavelet Thresholding with Context Modeling for Image Denoising," IEEE Transactions on Image Processing, vol. 9:9, pp. 1522-1531, Sep. 2000.

Tomasi and Manduchi, "Bilateral Filtering for Gray and Color Images," Proceedings of the 1998 IEEE International Conference on Computer Vision, Bombay, India, 1998.

Perona and Malik, "Scale-Space and Edge Detection Using Anisotropic Diffusion," IEE Transactions on Pattern Analysis and Machine Intelligence, vol. 12:7, pp. 629-639, Jul. 1990.

Sample pages from Numerical Receipts in C: The Art of Scientific Computing, "13.10 Wavelet Transforms," pp. 591-606, 1988-1992.

Donoho and Johnstone, "Ideal Spatial Adaptation by Wavelet Shrinkage," Dept. of Statistics, Stanford University, Stanford, CA, 94305-4065, U.S.A., pp. 1-40, Jun. 1992.

Donoho, "De-Noising by Soft-Thresholding," Dept. of Statistics, Stanford, University, pp. 1-37.

http://www.fmrib.ox.ac.uk/steve/susan/susan, node17.html, May 5, 1998.

Office Action for U.S. Appl. No. 11/472,169, dated Feb. 22, 2010, 16 pgs.

Office Action for U.S. Appl. No. 11/472,174, dated Apr. 14, 2010, 16 pgs.

* cited by examiner

METHOD AND SYSTEM FOR CHARACTERIZING NOISE

RELATED APPLICATIONS

This application, under 35 U.S.C. 119(e), claims priority to and the benefit of U.S. Provisional Patent Application No. 60/672,411, entitled "Method and Apparatus for Characterizing Noise in Digital Images and Imaging Devices" by Christian, filed Apr. 18, 2005, which is hereby fully incorporated by reference herein.

TECHNICAL FIELD OF THE INVENTION

The present invention relates to characterizing noise in a set of data. More particularly, embodiments of the present invention relate to a method and apparatus for characterizing noise in digital images and imaging devices.

BACKGROUND

Devices like digital cameras, film scanners, x-ray machines, and radar imaging devices typically introduce noise into the resulting image. The noise can result from a variety of sources, including sampling errors, temperature-induced "dark current" noise, amplifier noise, and grain in scanned film images. The noise may appear as grain, speckles, and other artifacts. When the amount of noise is sufficiently high, it can detract significantly from the quality of the image, and so it is desirable to remove it.

With many devices, noise is not constant across the image. For instance, well-illuminated areas might have very little noise, while deep shadows may exhibit obvious noise artifacts. The relationship between noise and factors like image brightness is unique for every type of device.

Published methods for characterizing noise and for removing or reducing it typically assume that noise is a function of image luminance and/or spatial frequency.

However, this is insufficient to accurately describe the noise for some devices. In particular, noise may be jointly dependent on luminance, color, and frequency.

U.S. Pat. Nos. 6,256,403 and 6,069,982 disclose methods for characterizing noise in digital imaging devices. In U.S. Pat. No. 6,256,403, the method is applied to grayscale medical images, and the noise in the image is characterized only in relationship to luminance. This patent does not appear to consider that noise might vary with factors other than luminance.

U.S. Pat. No. 6,069,982 pertains to color imaging devices. For each channel of a color space, noise is characterized using a two-dimensional power spectrum (called a "noise mask"), and the noise variance in is also separately related to luminance. This patent appears to relate noise only to gray-scale levels. So, this method may not accurately characterize noise that is dependent on both luminance and color.

SUMMARY OF THE INVENTION

Embodiments of the present invention provide a system and method of characterizing noise that eliminates, or at least substantially reduces, the shortcomings of prior art noise characterization systems and methods. Embodiments of the present invention provide a noise characterization system and method that can generate a noise profile that correlates noise values to multiple parameters including color, luminance and frequency.

One embodiment of the present invention comprises a method for characterizing noise in an image comprising, selecting one or more regions of the image to analyze, analyzing image data for the one or more regions, generating a noise profile for the image based on the dispersion values, wherein the noise profile correlates noise to color and luminance, and storing the noise profile in a computer-readable memory. Analyzing the image data can include determining a set of dispersion values for the selected regions, wherein each dispersion value corresponds to a selected region and a color channel. Analyzing the image data can further comprise applying a wavelet transform to the image data to generate a set of subband coefficients. The dispersion values can be determined based on the subband coefficients.

Another embodiment of the present invention can include a computer program product comprising a set of computer instructions stored on a computer-readable medium and executable by a computer processor. The set of computer instructions can include instructions executable to access a digital image stored in a memory, select image data to analyze for one or more regions of the image, analyze the image data for the one or more regions and generate a noise profile for the image that correlates noise to color and luminance. The image data can be analyzed to determine a set of dispersion values for the selected regions, wherein each dispersion value corresponds to a selected region and a color channel, and the noise profile can be generated based on the dispersion values. Analyzing the image data can further comprise applying a wavelet transform to the image data to generate a set of subband coefficients. The dispersion values can be determined based on the subband coefficients.

Yet another embodiment of the present invention can include a computer program product comprising a set of computer instructions stored on a computer-readable medium and executable by a computer processor. The set of computer instructions can include instructions executable to access a set of data stored in a memory (e.g., digital image data or other data) containing values for one or more parameters (e.g., values for various color channels or other parameters) for which noise is to be characterized, select subset data to analyze for one or more subsets selected from the set of data (e.g., select a region from the image or other set of data); analyze the subset data, generate a noise profile that correlates noise to the one or more parameters for which noise is characterized; and store the noise profile in a computer readable memory. Analyzing the subset data can include determining a set of dispersion values, wherein each dispersion value corresponds to a selected subset and parameter for which noise is to be characterized. The noise profile can be generated using the dispersion values.

Embodiments of the invention provide an advantage over prior art systems and methods of noise characterization by providing improved accuracy in characterizing and estimating noise levels in color images, which can improve the effectiveness of applications such as noise removal.

Embodiments of the present invention provide another advantage by characterizing noise in a manner that represents how the amount of noise in each color channel depends both on a subband of a wavelet transform and on pixel values in multiple color channels. This can provide more accurate noise characterization for wavelet-based noise removal in color images.

Embodiments of the present invention provide yet another advantage by providing a data structure that allows for quickly estimating color-dependent noise levels in a wavelet subband, given values for multiple color channels.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein.

DETAILED DESCRIPTION

Preferred embodiments of the invention are illustrated in the FIGURES, like numerals being used to refer to like and corresponding parts of the various drawings.

Organized data is often used to describe a subject matter of interest. For example, data can be organized to represent stock prices or an image. In the case of an image, data is most commonly organized into pixels, where each pixel contains coordinate values for a color or grayscale space. For instance, in the RGB color space, each pixel in an image contains separate red, green, and blue color values. In the YCrCb color space, each pixel contains a luminance (Y), red-green chroma (Cr), and blue-yellow chroma (Cb) value. Often, when data is collected, noise is introduced into the data. For example, a digital camera can introduce noise into color data. Embodiments of the present invention provide systems and methods for characterizing noise in a set of data. The noise profiles can correlate noise for one parameter based on values for that parameter or other parameters (e.g., can correlate the noise in the Cr color channel to the values of Cr, Cb and Y). Additionally, the noise profiles can characterize noise based on other parameters that may affect noise (e.g., wavelet level, ISO setting on a digital camera or other parameter).

For purposes of explanation, it is assumed that the data being processed to develop the noise profile can be expressed as one or more n-dimensional arrays. In the example of image data, 2-dimensional arrays can be used. However, it should be understood that embodiments of the present invention can be applied to data expressed in 1-dimensional arrays (e.g., a stock ticker), or 3 or greater dimensional arrays.

Various embodiments of the present invention provide a system and method for characterizing the noise in digital imaging devices, such as digit-al cameras, film scanners, x-ray machines, radar imagining devices and other devices that typically introduce noise in the resulting image. In practice, most digital images exhibit at least a small amount of noise, which is generally due to random or pseudo-random perturbations of pixel values during the image capture process, or resulting from JPEG compression or other processing. In some cases, the noise can be so strong that it represents a significant fraction of average pixel values and detracts from the visual quality of the image.

Figure 1:
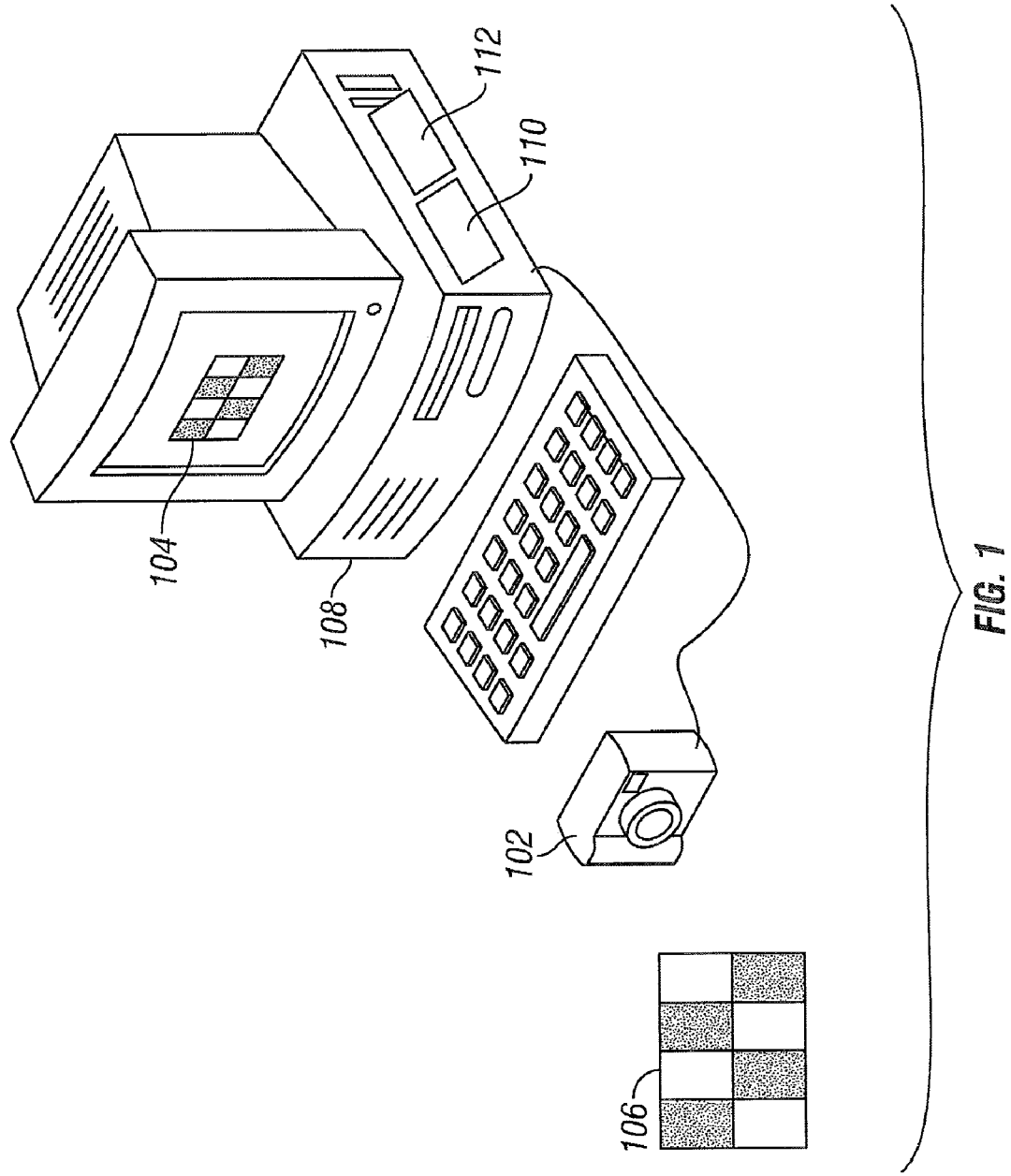
FIG. 1 is a diagrammatic representation of a system for characterizing noise.

FIG. 1 is a diagrammatic representation of one embodiment of a system for characterizing noise for a digital image. According to one embodiment of the present invention, a digital imaging device 102 (e.g., a camera) is used to capture a digital image 104 of a subject matter 106. The digital image can be an image of arbitrary subject matter, an image of a test pattern or other image. Preferably but not necessarily, the digital image 104 should contain uniform patches of different colors and tones sufficient to cover a large portion of imaging device 102's color space. For instance, according to one embodiment, subject matter 106 can be a chart made of rectangular or other shaped patches depicting a variety of colors and tones. However, any image that includes some uniform regions can be used. Digital image 104 can be taken in the red-green-blue ("RGB") color space, luminance-red-green chroma-blue-yellow chroma ("YCrCb") color space, Lab color space, gray-scale, CMYK color space or other space. The image data is essentially an array of pixel values for the image. Each pixel can have a value for each color channel (e.g., a red value, a green value and a blue value in RGB).

Digital image 104 is provided to an image processing computer 108 that can execute a noise characterization program 110. Noise characterization program 110 can display the image to a user through a user interface ("UI") and process the image to generate one or more noise profiles 112 based on the image and parameters related to the image (e.g., camera settings or other parameters). Noise profiles 112 can be used to eliminate or reduce noise in the digital image or other digital images in subsequent processing.

Noise profiles 112 can be constructed uniquely for the image being processed (e.g., the noise profiles 112 can simply be used for processing digital image 104) or the noise profiles can constructed once for a particular device and device settings and reused for a multitude of signals produced using the same device and devices settings (e.g., the noise profiles 112 can be used for processing image 104 and subsequent images taken by imaging device 102). For example, noise profiles 112 developed for a digital camera at each ISO sensitivity setting can be reused for images taken with same camera. According to other embodiments, noise profiles 112 can be constructed using imaging device 102 and used to process images taken by the same class of imaging device at the same settings (e.g., a noise profile developed for one Canon 10D digital camera at ISO 1600 can be used to process images taken by other CANON 10D digital cameras at ISO 1600) (CANON is a trademark of CANON, U.S.A of Lake Success New York and CANON, Inc. of Tokyo, Japan).

Noise profiles 112 are constructed, according to one embodiment of the present invention, by processing regions of digital image 104 to characterize the noise based on various parameters. Selection of the regions can be done by a human user or automatically. In the first case, noise characterization program 110 can present digital image 104 to a user in a UI that allows the user to select regions of digital image 104 (e.g., using a computer mouse to indicate the boundaries of a region in digital image 104). Preferably, the selected regions contain noise, but no important image detail. It should be noted, what constitutes important image detail can be user defined and regions having important image detail can be selected.

The selected regions can be rectangular, elliptical or otherwise shaped. Typically, the region size can depend on the number of levels of a wavelet decomposition applied to the region (discussed below in conjunction with FIG. 2). Regions sizes of 10×10, 14×14, 22×22, 38×38 and 54×54 pixels are sufficient for wavelet decompositions of 1, 2, 3, 4 or 5 levels, respectively, though the user can use different size regions based on the particular application and wavelet transform function. According to one embodiment, the selected region is approximately 100 pixels by 100 pixels, though more or less pixels can be selected.

Alternatively, regions can be selected using an automated selection process. For example, noise characterization program 110 can break an image into small squares and measure the mean and variance of each color channel of each square (e.g., the mean and variance of R,G and B pixel values in the square). Groups of contiguous squares can be assembled into larger squares or rectangles and statistical tests (e.g., t-test) or selection heuristics applied to determine whether the means and variances of the component squares are sufficiently similar. If the means and variances of the component squares are sufficiently similar, the larger square or rectangle can be selected as a region. The selected regions from digital image 104 are then processed by noise characterization program 110 to construct the noise profiles as discussed below.

Figure 2:
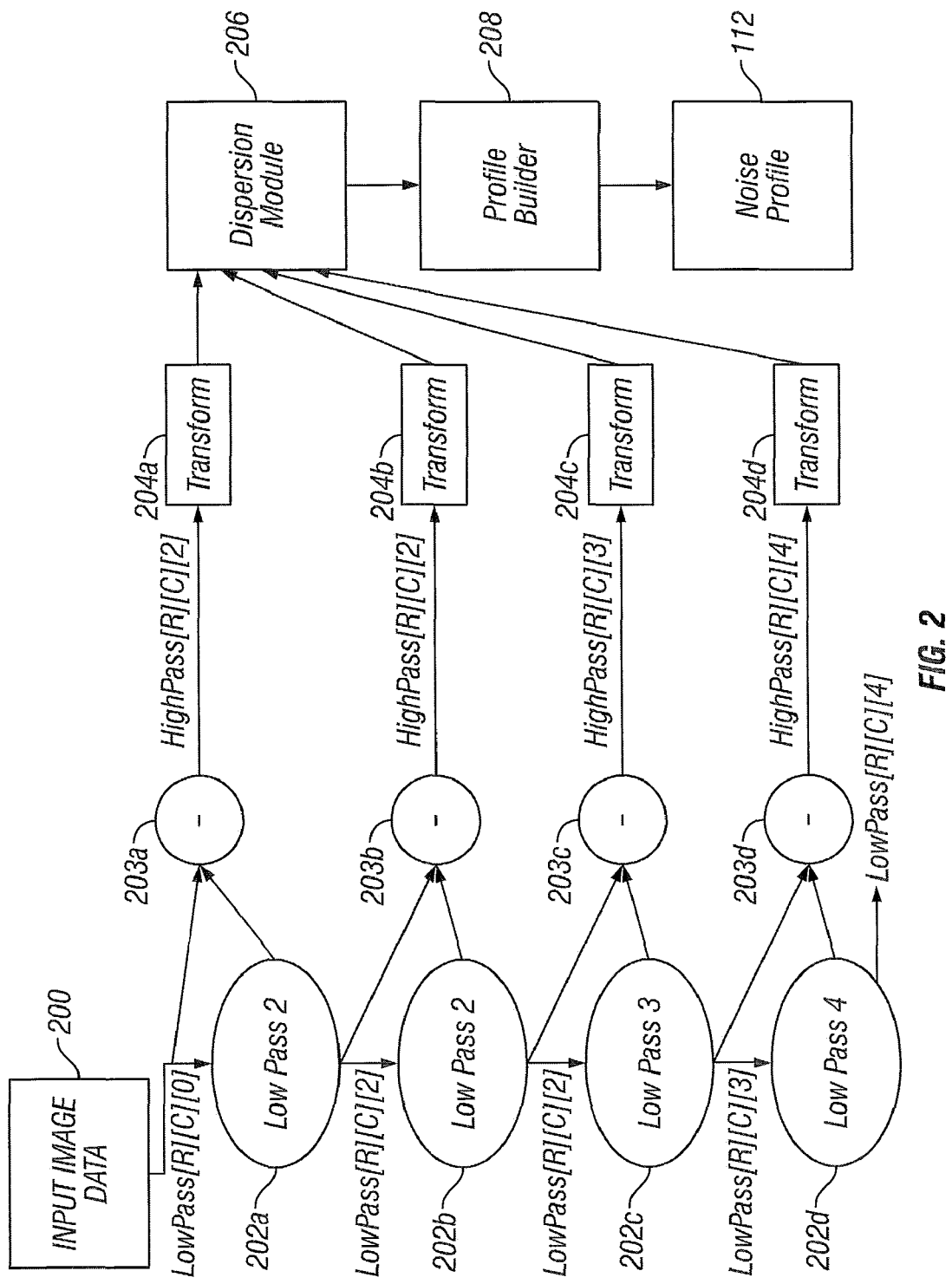
FIG. 2 is a diagrammatic representation of the functionality of one embodiment of a noise characterization program.

FIG. 2 is a functional block diagram of one embodiment of processing a region 200 selected from digital image 104 by noise characterization program 110. Processing can include application of low pass filters 202a-d, subtractors 203a-d, transform modules 204a-d, dispersion module 206 and profile builder 208. It should be noted that the various functions can be implemented using a suitable programming language and architecture.

Digital image 104 is optionally converted to the color space used by the noise reduction process that later applies the noise profiles to reduce noise in digital images. For example, if the noise reduction process uses the YCrCb color space, digital image 104 can be converted from RGB to YCrCb so that region 200 is processed by noise characterization program 110 in YCrCb. Any color space can be used, however. Moreover, conversion to a particular color space can be interleaved with subsequent steps and the individual regions can be converted rather than the entire digital image 104. Using the example of the YCrCb color space, noise characterization program 110 records the mean Y, Cr and Cb values for region 202 recorded (e.g., as Y[R], Cr[R] and Cb[R]), which are provided to table builder 208 as described below.

A wavelet transform is then applied to the selected regions of digital image 104. There are many wavelet transforms known in the art, including Discrete Wavelet Transform, the "a trous" wavelet transform, shifted transforms, undecimated transforms and other transforms. Example computer source code for a discrete wavelet transform is available in Numerical Recipes in C, Sedond Edition, Cambridge University Press, 1992, pp. 592-595, which is hereby fully incorporated by reference herein. Embodiments of the present invention can use any of these transforms or other suitable transform known in the art. Preferably, the number of levels in the transform should be the same as that used for the intended noise removal process.

According to one embodiment, decomposition into wavelet subbands is performed by filtering each color channel of region 200 through a set of low pass filters 202a-202d and subtracting the result from the result of the previous filter (if any). It should be noted that while in FIG. 2, four levels of low pass filtering are illustrated, there may be more or fewer levels. Furthermore, the type of low pass filter applied at each level can be different. To perform the a trous decomposition for a region, for example, let Lowpass[R][C][0] through Lowpass[R][C][Z] be a set of pixel rasters corresponding to the number of levels Z of the wavelet decomposition for a particular color channel and region. The pixel values in each raster are generally referred to as coefficients. Each raster includes coefficients for a color channel. Z can be four or can be larger or smaller. Lowpass[R][C][i] will contain the low pass filtered image data for level i of the wavelet transform for color channel C for region R. For example, for region R1 in the YCrCb color space, the original image color data can be Lowpass[R1][Y][0]; Lowpass [R1][Cr][0] and Lowpass [R1][Cb][0], and the first level of decomposition image color data can be Lowpass[R1][Y][1]; Lowpass [R1][Cr][1] and Lowpass [R1][Cb][1].

According to one embodiment of the present invention a low-pass filter is applied to each pixel in Lowpass[R][C][i] to create Lowpass[R][C][i+1], where, according to one embodiment of the present invention, the distance used for the pixel neighborhood is equal to $2^i$. That is, the pixel located at coordinates (x, y) in Lowpass[R][C][i+1] is the low-pass filtered version of the pixel located at (x, y) in Lowpass[R][C][i] and the spacing between neighborhood pixels doubles for each level of the wavelet decomposition. According to other embodiments, the spacing between neighborhood pixels can be more or less.

In a preferred embodiment, the low-pass filter is a homogeneity-based filter or feature-directed predictor-based filter. Examples of homogeneity-based filters and feature-directed predictor based filters are described in U.S. Provisional Patent Application No. 60/692,380, entitled "Homogeneity-Based NonLinear Low-Pass Filter", by Christian, filed Jun. 21, 2005, U.S. Provisional Patent Application No. 60/692,367, entitled "Low-Pass Filter with Feature-Directed Predictors", by Christian, filed Jun. 21, 2005; and U.S. Provisional Patent Application No. 60/692,413, entitled "Method for Removing Noise From Digital Images and Other Signals", by Christian, by Christian, filed Jun. 21, 2005, each of which is hereby fully incorporated by reference herein. However, other filters can be used, including the weighted median filter, bilateral filter, anisotropic filter, inverse gradient filter, neighborhood-weighted average or other filter. The parameters of these filters can be determined experimentally, or exposed to the user via controls in noise characterization program 110.

At 203a-203d, Lowpass [R][C][i+1] can be subtracted from Lowpass[R][C][i] to create HighPass[R][C][i] and so on. Thus, in the four wavelet decompositions levels, HighPass [R][C][0] through HighPass[R][C][3] are created for each region and color channel. In an a trous wavelet transform, Lowpass[R][C][Z] is a residual subband.

The coefficients of various subbands can be further transformed. For example the coefficients of each of HighPass[R][C][0] through HighPass[R][C][3] can be transformed at 204a-204d. For instance, an edge detector or other function, including nonlinear functions and functions that incorporate information simultaneously from multiple subbands, color channel or the original image data, can be applied at 206a-206d. The transforms applied at each wavelet subband can correspond to transforms applied at the same wavelet subbands in an intended noise reduction process. In other words, the same transforms can be used in characterizing noise in an image that are later used in reducing the noise in an image.

Multiple transforms can be accommodated by transforming the coefficients of each HighPass[R][C][i] according to multiple transform methods to created multiple transformed versions of HighPass[R][C][i]. Thus, embodiments of the present invention can profile noise for multiple noise reduction processes that use various transforms.

For example, if the noise reduction process applies feature detectors, as described in U.S. Provisional Patent Application No. 60/692,413, transformation modules 206a-206d can similarly apply feature detectors to coefficients of the wavelet subbands. For example, for each coefficient x in HighPass[R][C][0], a feature detector function can take an input of neighborhood values corresponding to x and produce a scaler- or vector-valued numeric result. The neighborhood can include adjacent or nonadjacent coefficients from HighPass[R][C][0], coefficients in other subbands in the same wavelet pyramid, and data values from the original signal. According to one embodiment, the feature detector function considers a fixed-size square neighborhood around each coefficient x in HighPass[R][C][0].

For example, a feature detector function can take as input a 5×5 neighborhood of coefficients from HighPass[R][C][0] with a center coefficient x and determine the 3×3 quadrant QMIN of coefficients in the 5×5 neighborhood that has the lowest mean absolute deviation from x. The feature detector function returns the mean absolute value of the coefficients in QMIN. This function is useful in that it can detect edges and other features in HighPass[R][C][0] even when they don't align nicely with compass directions. If x is part of an edge, then it will normally have a high value relative to the noise, and this particular feature detector will tend to average nearby pixels with similar values, and the resulting average will be higher than would normally be expected for noise. Likewise, if a pixel is actually noise, even if it is close to an edge, the most similar pixels nearby will also be noise, and they will be averaged instead of the edge pixels. The net result is good discrimination of edge pixels from non-edge pixels.

Other choices are possible for transforms applied to the wavelet subbands. For instance, a detector that simply returns the square or absolute value of the single coefficient x can be used. Sobel- or Prewitt-style edge detectors are other examples of possible transforms. Yet another example of a transform is the mean absolute deviation or mean square of a neighborhood of pixels. A further example is a weighted average of coefficients in a neighborhood, where the weighting for a coefficient is inversely proportional to the absolute difference between a selected coefficient and the center coefficient of the neighborhood.

Thus, a variety of transforms can be used to process the wavelet subbands of a wavelet transform. According to one embodiment, noise characterization program 110 applies the same wavelet transform to the image data and applies the same transforms to the coefficients of each wavelet subband as are applied during the intended noise reduction procedure for which the resulting noise profile will be used.

Dispersion module 206 measures the dispersion of coefficients in the wavelet subbands (transformed or untransformed). In other words, dispersion module 206 determines a set of dispersion values for the selected regions (e.g., from the transformed or untransformed coefficients). In the example of FIG. 2, the dispersion is measured for each subband i except the low-pass residual subband Lowpass[R][C][4] (e.g., the dispersions of each of HighPass[R][C][0] through HighPass[R][C][3] are measured). The dispersion, for purposes of this disclosure, can be represented as $\sigma[R,C,i]$, where R is the region, C the color band and i the wavelet level. A variety of dispersion methods can be used, including standard deviation. To cope with non-Gaussian coefficient distributions, other estimates of dispersion can be used, for instance the mean absolute deviation or the maximum. Again, the statistic used to measure dispersion can be based on the noise reduction process that will use the resulting noise profiles.

If the size of a region R is too small to obtain a meaningful dispersion metric at a particular wavelet level (e.g., number of samples in the region is statistically insignificant), then the dispersion metric can be set to −1 or some other distinguished "flag" value to indicate that no value is available. As discussed below, such a value can be replaced later by interpolating other available values.

Dispersion module 206 can further calculate a set of decay pattern values. For example, dispersion module log can calculate normalized dispersion values $\Theta[R,C,i]$, where $\Theta[R,C,i]=\sigma[R,C,i]/\sigma[R,C,0]$. $\sigma[R,C,0]$ is the dispersion of the high-frequency subband for channel C of Region R with increasing values of i corresponding to lower frequency subbands.

The dispersion data is passed to a noise profile builder 208 that can store noise profiles 112 (e.g., in computer readable storage). A noise profile can be stored in a number of data structures including, but not limited to dense and sparse arrays. According to one embodiment, noise profile builder 208 creates the noise profiles by populating one or more tables. In one embodiment, the tables represent a w by y by z array, wherein w, y and z represent the number intervals for each color channel. For example, an 8×8×8 cube can be used that overlays the YCrCb color space (e.g., each dimension of the YCrCb space is divided into 8 intervals).

Using the example of an 8×8×8 cube, for each wavelet level i, there can be a lookup table LUT[C,i] for each color channel. Each table can be mapped by the color coordinates y, cr, and cb in the range 0.0 to 1.0. To map a color tuple (y, cr, cb) to an entry in the table (i.e., a cell located at h, j, k in the table), the indices h=Trunc(y*7.999), j=Trunc(cr*7.999) and k=Trunc(cb*7.999), where Trunc is the truncation function, are calculated. Thus, LUT[C,i](y,cr,cb) denotes the table entry corresponding to an arbitrary color tuple for a color channel and wavelet level.

Initially, all lookup table entries can be flagged as not containing data. For example, all lookup table entries can be set to −1. For each region R, color channel C, and wavelet level i, the entry for LUT[C,i](Y[R],Cr[R],Cb[R]) is set to $\sigma[R,C,i]$. For example, for region R1, color channel Y, wavelet level 1, the table entry in the location of LUT[Y,1] corresponding to Y[R1],Cr[R1],Cb[R1] is populated with $\sigma[R1,Y,1]$. Additional values in LUT[Y,1](y, cr, cb) can be similarly populated with the values of $\sigma[R,Y,1]$ from other regions. If there is a collision (i.e., if two Y[R],Cr[R],Cb[R] tuples from different regions map to the same cell in the table) the larger value of $\sigma[R,C,i]$ can be inserted. According to another embodiment, mean, median or other combining function for the colliding values $\sigma[R,C,i]$ can be used to populate the corresponding table entry. Each populated table entry will also have a corresponding $\Theta[R,C,i]$.

When the tables have been populated with the values of $\sigma[R,C,i]$, the missing values can then be interpolated. Continuing with previous example, and assuming there are no collisions, LUT[Y,1] will contain a value for $\sigma[R,Y,1]$ for each region R selected. The values not filled in (e.g., the values still marked as unavailable) in LUT[Y,1] can be interpolated. According to one embodiment, for each cell (h,j,k) of LUT[C,i], the YCrCb coordinates (y,cr,cb) are calculated corresponding to the center of the cell. A normalized dispersion value $\Theta[h,j,k]$ is calculated using a weighted average of $\Theta[R,c,i]$ for the color channel and wavelet level. Assuming the table coordinates range from 0 to 1 for all three dimensions as discussed above, one weighting function for cell x and region R is $\Theta[R,C,i]\ e^{-d*2.5}$ where d is the Euclidean distance between the center of x and the YCrCb coordinate for R for the color channel C and wavelet level i. Using the previous example and filling in the LUT[Y,1] table, for region R1, d would equal the Euclidean distance from the center of cell x to the center of the cell corresponding to Y[R1],Cr[R1],Cb[R1] (i.e., the center of the cell containing $\sigma[R1,Y,1]$). Each of $\Theta[R,Y,1]$ values can be weighted based on its distance d from cell x to interpolate $\Theta[h,j,k]$.

A highest frequency dispersion measure $\sigma_0[h,j,k]$ for cell location h,j,k can also be determined. Initially, LUT[C,0](h, j,k) can be consulted and that value used. For example, for cell x in LUT[Y,1], LUT[Y,0](h,j,k) is evaluated. If a dispersion value σ exists at that location (e.g., the cell is not blank or populated by −1 or other flag), this value is $\sigma_0$[h,j,k]. If no dispersion value exists at h,j,k in LUT[Y,0], the value of $\sigma_0$[h,j,k] in LUT[Y,0] can be interpreted from nearby dispersion values for the level 0 wavelet subband of channel Y. In other words $\sigma_0$[h,j,k] can be interpolated from other dispersion σ values in LUT[Y,0] (e.g., using a weighted average or other interpolation technique).

The normalized dispersion value Θ[h,j,k] can be multiplied by the high-frequency dispersion value $\sigma_0$[h,j,k] to obtain the interpolated value for cell (i,j,k) for the color channel and wavelet level. Continuing with the previous example, Θ[h,j,k] determined for h,j,k of LUT[Y,1] for cell x can be multiplied by the value of $\sigma_0$[h,j,k] from LUT[Y,0] to determine σ[h,j,k] in LUT[Y,1] for cell x.

Multiplying $\sigma_0$[h,j,k] by Θ[h,j,k] exploits the insight that the decay patterns for noise across wavelet levels tend to be relatively stable compared to the absolute noise levels, which show more variance with color and tone. Also, there are often more small regions than large regions available for analysis, resulting in more high-frequency measurements than low-frequency measurements. However, other suitable interpolation techniques can be used to provide missing dispersion values.

A noise profile has now been constructed in the form of multiple lookup tables. To estimate the noise level in color channel C for a yCrCb color value and frequency band i, the dispersion value can be fetched from LUT[C,i] from the table location corresponding to yCrCb.

It should be noted that while, in the above embodiment, lookup tables are created for each color channel and wavelet level, additional lookup tables can be created or parameters considered. For example, noise profiles can be developed for each ISO setting of a digital camera. In this case, there can be lookup tables LUT[C,0] through LUT[C,Z−1] for each ISO setting of the digital camera for which a noise profile is developed. The noise profiles can be developed that correspond to an arbitrary number of parameters.

Figure 3:
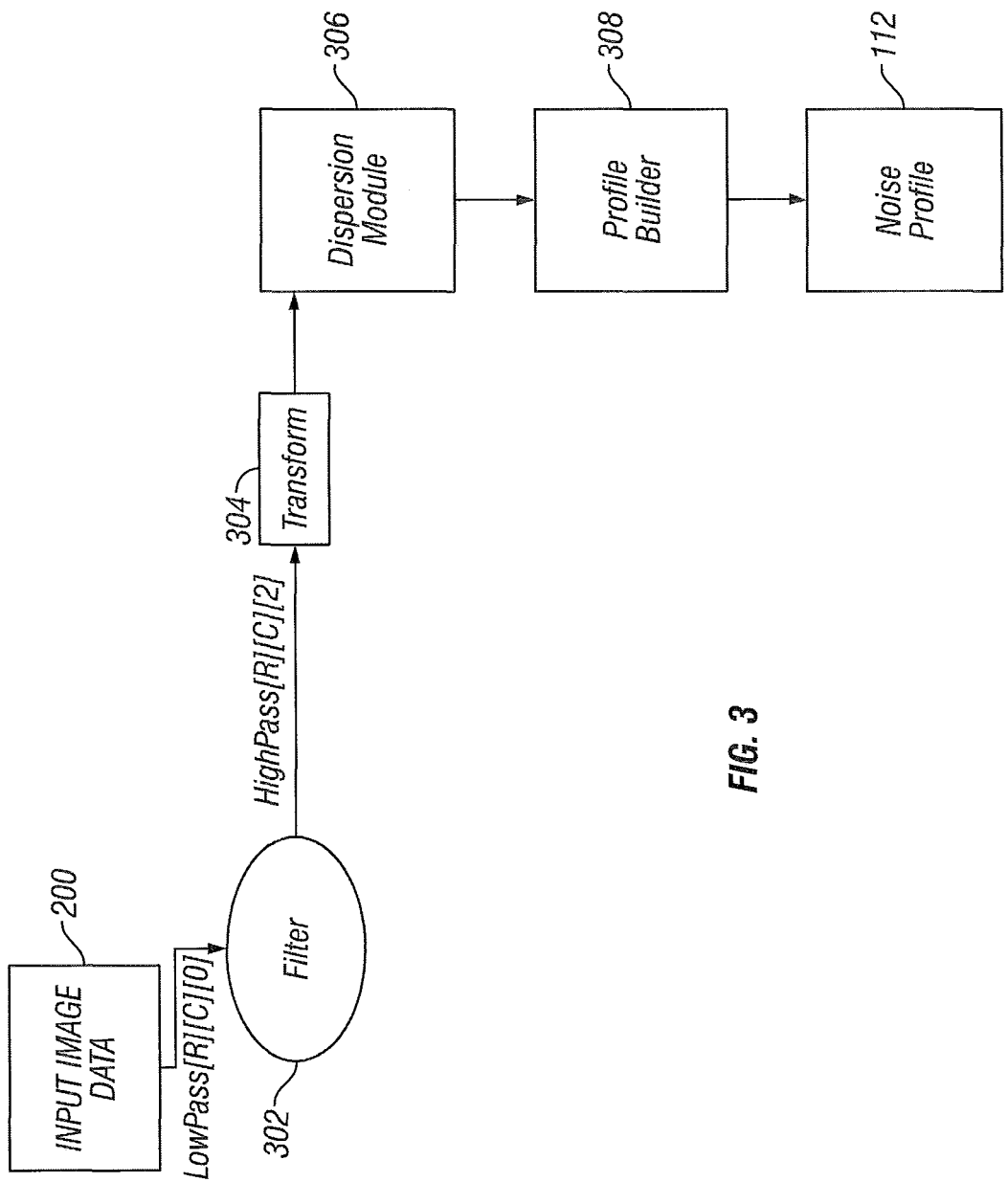
FIG. 3 is a diagrammatic representation of the functionality of another embodiment of a noise characterization program.

In the previous example, a wavelet transform is applied to region 200. In another embodiment, however, wavelet decomposition is not utilized. FIG. 3 is a functional block diagram illustrating processing performed by noise characterization program 110 to generate a noise profile without applying a wavelet transform. Processing can include a filter 302, a transform module 304, a dispersion module 306 and a noise profile builder 308. It should be noted that the functions described in conjunction with FIG. 3 can be implemented according to any suitable programming language or architecture.

As discussed above, image 104 can be converted to a preferred color space (e.g., YCrCb or other color space). Low[R][C][0] (e.g., the original image data for each color channel for each region). Each color channel of the selected region is filtered by filter 302 to create High[R][C][0] for each color channel of the region (i.e., the high pass band for the region). Filter 302 is a homogeneity-based filter, feature-directed predictor-based filter or other suitable filter.

The coefficients of the high passed subband can be further transformed. For example, the coefficients of each of HighPass[R][C][0] can be transformed at 304. For instance, an edge detector or other function, including nonlinear functions and functions that incorporate information simultaneously from multiple subbands, color channel or the original image data, can be applied at 304.

Dispersion module 306 measures the dispersion of coefficients in the High[R][C][0] rasters (transformed or untransformed). The dispersion, for purposes of this disclosure, can be represented as a[R,C,0], where R is the region, C the color. A variety of dispersion methods can be used, including standard deviation. To cope with non-Gaussian coefficient distributions, other estimates of dispersion can be used, for instance the mean absolute deviation or the maximum. The statistic used to measure dispersion can be based on the noise reduction process that will use the resulting noise profiles.

The dispersion data is passed to a noise profile builder 308 that can store noise profiles 112 (e.g., in storage). A noise profile can be stored in a number of data structures including, but not limited to dense and sparse arrays. According to one embodiment, noise profile builder 310 creates the noise profiles by populating one or more tables. Again, for the sake of example, an 8×8×8 cube can be used that overlays the YCrCb color space (e.g., each dimension of the YCrCb space is divided into 8 intervals). The 8×8×8 cube for each color channel is populated with the dispersion values σ[R,C,0] for each region using Y[R]Cr[R]Cb[R] to place the dispersion values in the appropriate cells. The remainder of the cells can be interpolated using weighted averages or other interpolation schemes known in the art.

According to another embodiment, rather than measuring dispersion σ[R,C,0] from the high-pass-filtered version of each region, the dispersion can be measured from the non-filtered version of each region. Thus, in one embodiment, wavelet decomposition is not utilized and noise statistics are measured directly from the original regions or from a high-pass-filtered version of each region. The noise profiles can reduce to a single lookup table per color channel, rather than a table for each color channel and wavelet level.

Figure 4:
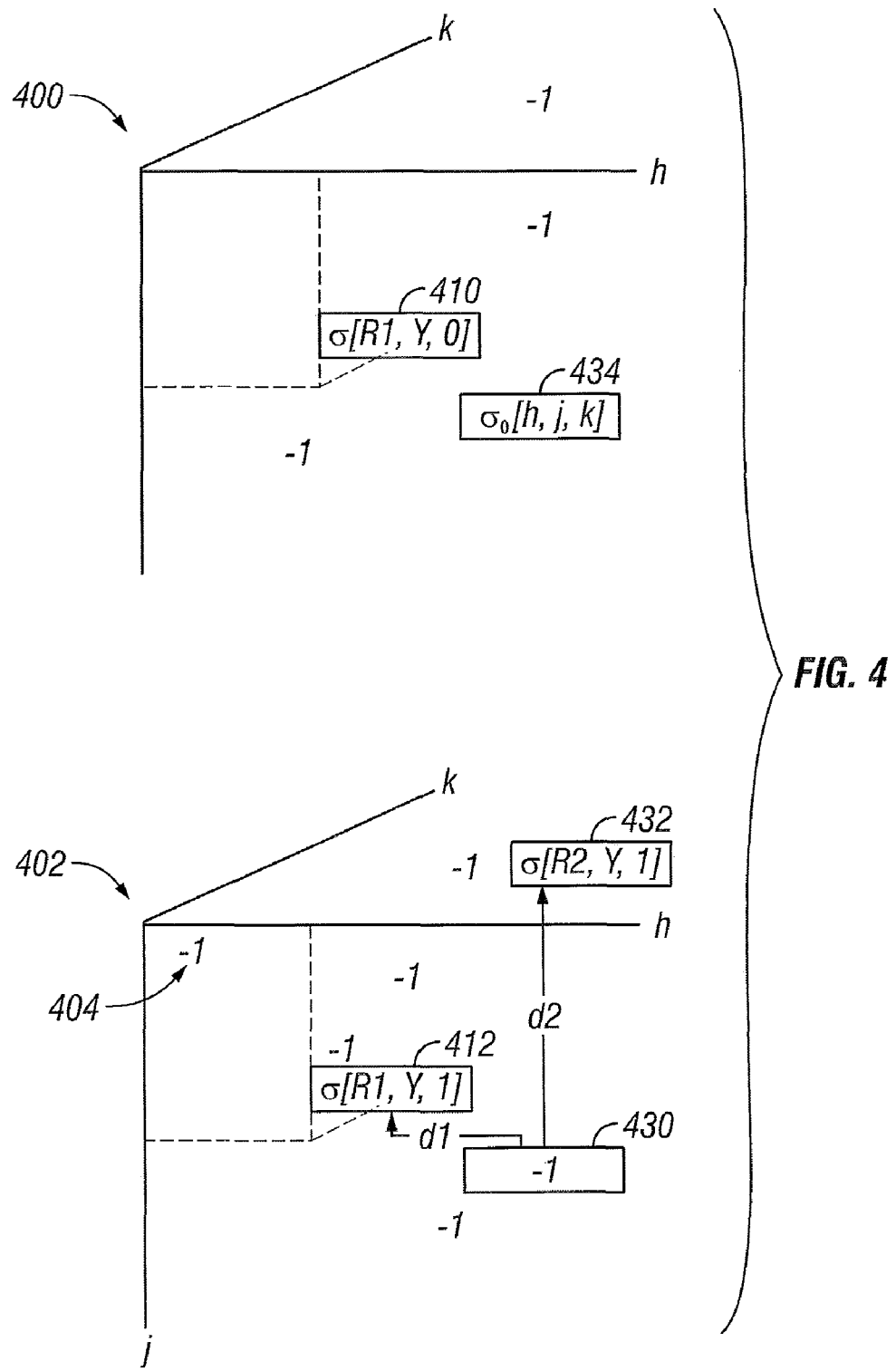
FIG. 4 is a diagrammatic representation of an embodiment of a partial data structure for storing a noise profile.

FIG. 4 is a diagrammatic representation of one embodiment of interpolating noise characteristics. Shown in FIG. 4 is cube 400 for color channel Y wavelet level 0 and cube 402 for color channel Y wavelet level 1. It should be noted that there can be additional cubes for additional wavelet levels and color channels. Data for each cube can be stored as one or more lookup tables or other data structures. Each cube is partially populated for the sake of example. Each cell that is not yet populated with a dispersion value can be set to −1 or otherwise flagged. For example cube 402 includes the value −1 (indicated at 404) to indicate that the cell having h,j,k location 1,1,0 does not yet have a corresponding dispersion value. For the sake of clarity, only some of the −1 flags are shown in FIG. 4.

The cubes can be initially populated with the dispersion values calculated for the various regions for a subband and wavelet level. For a particular region, the cell in the color channel-wavelet level cube that is populated with the dispersion value for that region, color channel and wavelet level is determined by converting the average, mean median or other statistical measure of Y, Cr and Cb levels for the region to a cell location. To map a color tuple (y, cr, cb) to an entry in the table (i.e., a cell located at h, j, k in the table), the indices h=Trunc(y*7.999), j=Trunc(cr*7.999) and k=Trunc(cb*7.999), where Trunc is the truncation function, are calculated. Thus, for region 1 (R1), color channel Y, wavelet level 0, the appropriate cell is populated with the dispersion value, in this example it is the cell located at h=trunc(7.99*Y[R1]), j=trunc(7.99*Cr[R1]), k=trunc(7.99*Cb[R1]). For example, the dispersion σ[R1,Y,0] can be mapped to cell (2,3,1) of cube 400 (represented at 410) and a[R1,Y,1] can be mapped to cell (2,3,1) of cube 402 (represented at 412).

For the highest wavelet level cube (e.g., cube 400), the dispersion values for cells flagged −1 can be interpolated from the $\sigma_0$ values populated from measurements from the selected regions. This can be done, for example, using a weighted average based on the Euclidean distance of a cell to be populated to the cells populated from the selected regions or other interpolation routines. For example, if various cells are populated with σ values in cube 400, other cells can be populated using a weighted average or other interpolation scheme.

According to one embodiment, for lower wavelet levels, the interpolation can involve a two step process. For a cell to be populated with an interpolated value, the YCrCb coordinate is calculated corresponding to the center of the cell. For example, if cell 430 is to be populated, the YCrCb value corresponding to the center of cell 430 can be calculated. A normalized dispersion value Θ[h,j,k] for cell 430 can then be calculated using the weighted average of all Θ[R,C,i] values for that color channel and wavelet level. For example, if cells 412 and 432 are populated with dispersion values σ[R,Y,1] for two selected regions (e.g., R1 and R2), cells 412 and 432 will have corresponding Θ[R,Y,1] values. If the Euclidean distance to the center of cell 412 is $d_1$ and the Euclidean distance to the center of cell 432 is $d_2$, the weighting function of Exp(−d*2.5) can be used to weight Θ[R1,Y,1] (corresponding to cell 412) and Θ[R2,Y,1] (corresponding to cell 432) to calculate a value for Θ[h,j,k] (the normalized dispersion value for cell 430). It should be noted that other suitable data interpolation techniques can used.

In the second step, the corresponding cell (i.e., the cell with the same h,j,k coordinates as cell 430 in table 402) in the highest frequency level cube (e.g., cube 400) is consulted to determine $\sigma_0$[h,j,k] (represented at 434). In this example, cell 430 in table 402 has the same coordinates as cell 434 so the value of $\sigma_0$ in cell 434 can be used. If the corresponding cell does not yet have a $\sigma_0$ value populated (e.g., if cell 434 is still marked with −1), the value can be interpolated at this point. When both a $\sigma_0$(h,j,k) and Θ[h,j,k] have been determined for cell 430, the σ(h,j,k) value of cell 430 can be determined by $\sigma_0$(h,j,k)*Θ[h,j,k]. This process can be repeated until all the values of cube 402 are populated.

Each cube, as discussed above, can be represented as a lookup table LUT[C,i]. Thus, cube 400 can be stored as LUT[Y,0] and cube 402 can be stored as LUT[Y,1]. To locate the noise characteristic for a particular color and tone and wavelet level, the Y,Cr,Cb values are converted to a h,j,k cell number, as described above, and the a value that cell retrieved.

It should be noted that in an embodiment that does not utilize wavelet transforms, only one lookup table is required. Using the example in which the lookup table represents an 8×8×8 cube, only one cube is populated values. The process of populating the a values for the cube can be similar to the process for populating the $\sigma_0$ values of table 400.

Figure 5:
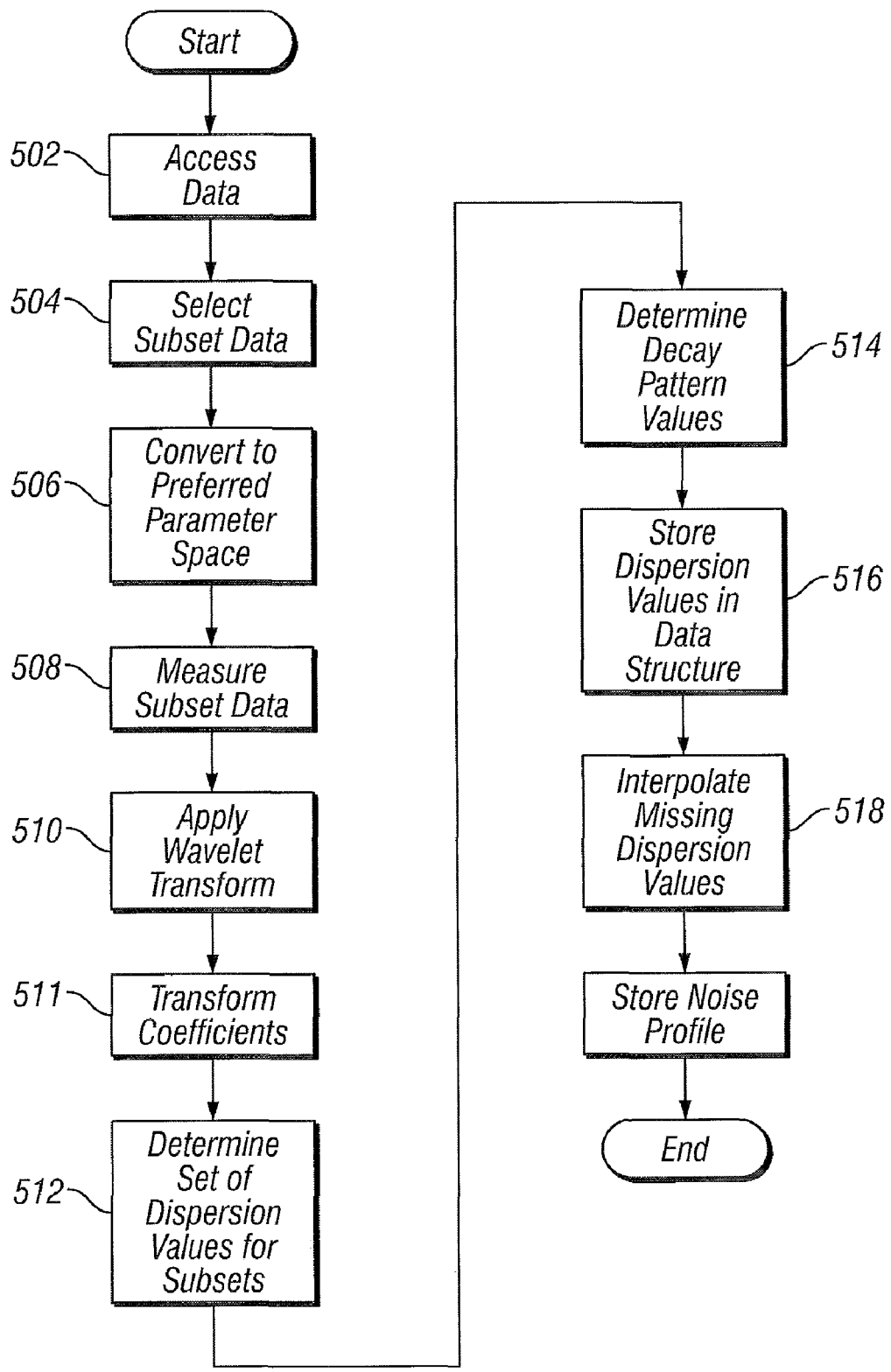
FIG. 5 is a flow chart for one embodiment of a method for characterizing noise.

FIG. 5 is a flow chart illustrating one embodiment of a method for characterizing noise. One or more steps of the method of FIG. 5 can be implemented through execution of a program stored on a computer readable medium (e.g., noise characterization program 110 of FIG. 1).

Embodiments of the present invention can be applied to various forms of data that provide a value for some aspect of a subject matter. For the sake of explanation, the example of image data is used. The image data can be expressed in an array of data values for each pixel of an image. In one embodiment, the image data provides values for the R,G and B color channels.

The noise characterization program accesses the data to be analyzed (step 502) and selects subset data for one or more subsets of the data to be analyzed to characterize the noise (step 504). For example, the noise characterization program can present a digital image to a user (e.g., through a UI) and allow the user to select regions or the noise characterization program can automatically select the regions. The noise characterization program can convert the regions (or entire set of data) into a preferred parameter space (step 506). In the case of a digital image, for example, the image data can be converted into a preferred color space, such as RGB, YCrCb or other color space.

For each parameter for which noise is being characterized, the noise characterization program can determine a statistical measure of that parameter for each subset (step 508). For example, the noise characterization program can determine the average Y, Cr and Cb measures for each region.

At step 510, the noise characterization program can apply a wavelet transform to the subset data to decompose the data for the subsets into subbands for each parameter for which noise is being characterized. The wavelet transform can by any wavelet transform known or developed in the art, including the Discrete Wavelet Transform, the "a trous" wavelet transform, shifted transform, undecimated transforms or other transforms. For example, in the case of a digital image, the wavelet transform can be applied to each selected region to produce wavelet subbands for each color channel. Optionally, the coefficients of each wavelet subband can be transformed, for instance, by an edge detector or other functions, including nonlinear functions and functions that incorporate information simulatanesoulsy from multiple subbands, parameters and the original data (step 511).

For each subset and parameter in the original data for which noise is being characterized (e.g., for each region and color channel), a dispersion value characterizing the coefficients in selected subbands can be measured (step 512). In other words, the noise characterization program can determine a set of dispersion values for the selected subsets. For example, σ[R,C,i] for each subband, except the residual subband, can be determined for each region selected from an image. Any number of dispersion measures can be used, including standard deviation, mean absolute deviation or maximum or other statistical measure of dispersion. If the region is too small to obtain a meaningful dispersion metric at a particular wavelet level, then the dispersion metric can be flagged (e.g., set to −1 or other flag) to indicate that no value is available.

The noise characterization program can further determine decay pattern values for the selected subsets (step 514). For example, the noise characterization program can determine the normalized dispersion values for one or more of the subbands. The normalized dispersion value can be calculated, for example, according to Θ[R,C,i]=σ[R,C,i]/σ[R,C,0].

The dispersion values from step 512 and 514 can be inserted into a set of tables that map parameter values at each wavelet level to a noise level for each parameter (step 516). For example, dispersion values can be inserted into a set of tables that map YCrCb color values at any wavelet level to a noise level for each Y, Cr, Cb color channel. The missing values can then be interpolated (step 518). The steps of FIG. 5 can be repeated as needed or desired.

Figure 6:
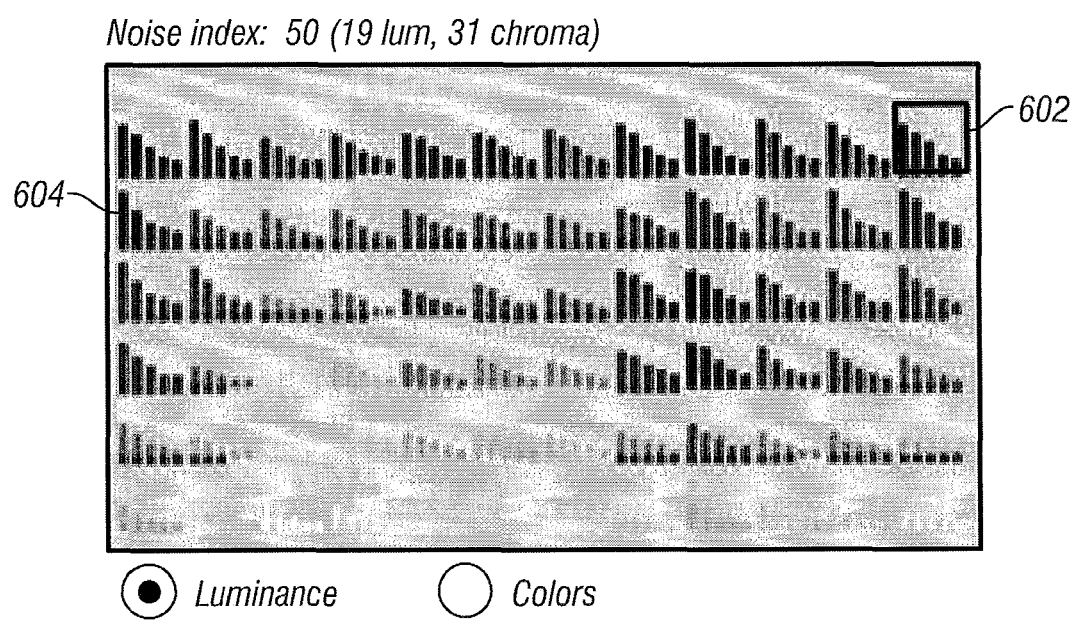
FIG. 6 is a diagrammatic representation of one embodiment of a user interface displaying a noise profile created for digital camera.

FIG. 6 is a diagrammatic representation of a user interface displaying a noise profile 600 created for a CANON 10D digital camera at ISO1600. The chart denotes noise levels for the luminance (Y) channel of the YCrCb color space. Each cell in the chart (e.g., cell 602, cell 604 and so on) corresponds to a different color/tone coordinate. The horizontal axis denotes hue and the vertical axis denotes tone. Each bar in a cell corresponds to a level of wavelet decomposition, where the leftmost bar corresponds to the high frequency subband. As can be seen, the noise for this particular camera depends on both color and tone.

Figure 7:
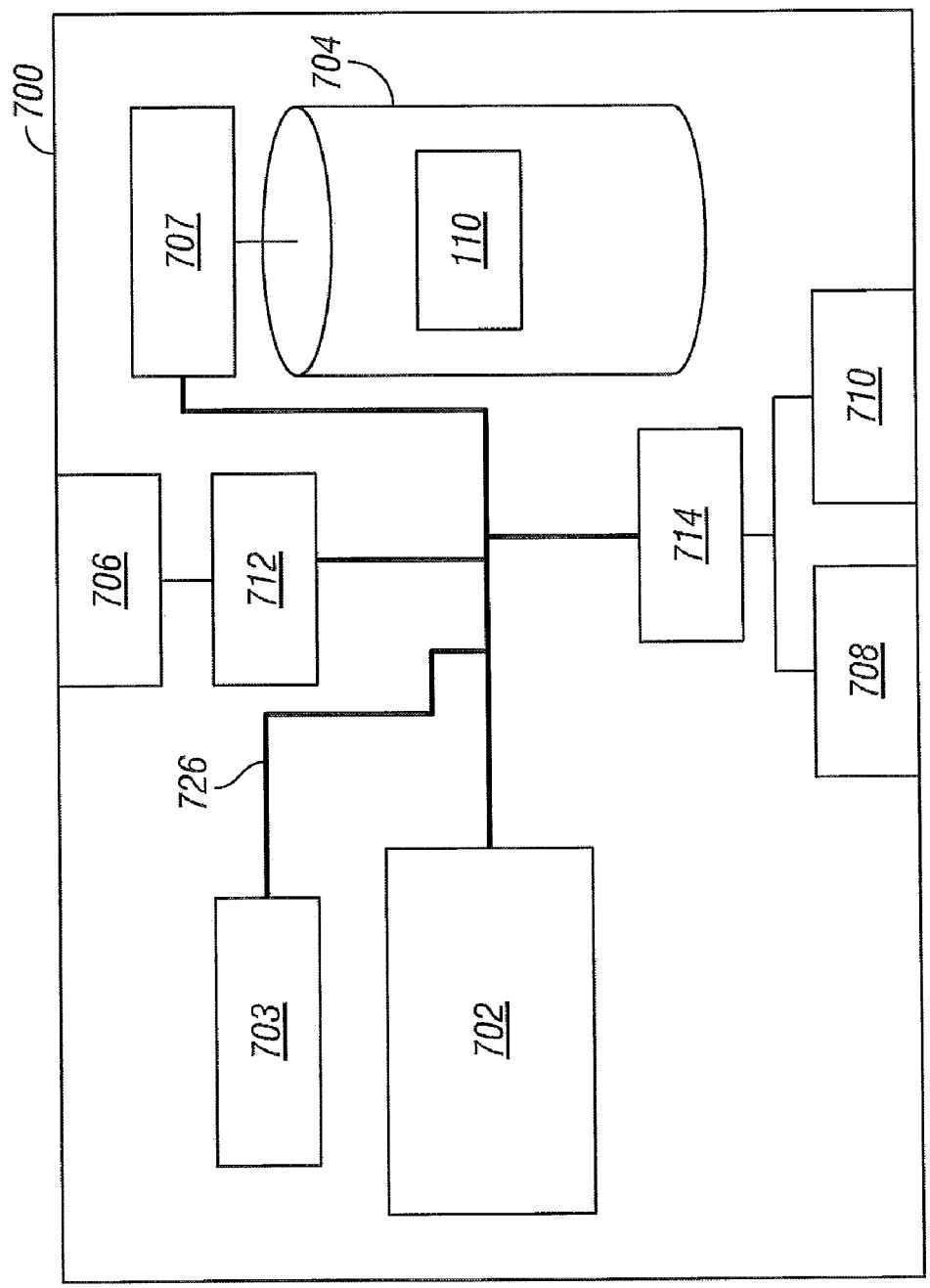
FIG. 7 is a diagrammatic representation of one embodiment of a computer system for characterizing noise.

FIG. 7 is a diagrammatic representation of a computer system that can run a noise characterization program ("computer 700"). Computer 700 can include a processor 702, such as an Intel Pentium 4 based processor (Intel and Pentium are trademarks of Intel Corporation of Santa Clara, Calif.), a primary memory 703 (e.g., RAM, ROM, Flash Memory, EEPROM or other computer readable medium known in the art) and a secondary memory 704 (e.g., a hard drive, disk drive, optical drive or other computer readable medium known in the art). A memory controller 707 can control access to secondary memory 704. Computer 700 can include I/O interfaces, such as video interface 706 and I/O interfaces 708 and 710 to connect to other devices. A video controller 712 can control interactions over the video interface 706 and an I/O controller 714 can control interactions over I/O interfaces 708 and 710. Computer 700 can include a variety of input devices. Various components of computer 700 can be connected by a bus 726.

Secondary memory 704 can store a variety of computer instructions that include, for example, an operating system such as a Windows operating system (Windows is a trademark of Redmond, Wash. based Microsoft Corporation) and applications that run on the operating system, along with a variety of data. More particularly, secondary memory 704 can store a software program 110 that characterizes the noise in a set of data (e.g., image data). During execution by processor 702, portions of program 110 can be stored in secondary memory 704 and/or primary memory 703.

Embodiments of the present invention provide a system and method for characterizing noise according to multiple parameters in a set of data. Embodiments of the present invention provide accurate noise characterization of noise, particularly when noise is dependent jointly on luminance, color and frequency instead of only a subset of these factors. Additionally, embodiments of the present invention provide a simple lookup mechanism for estimating noise given a particular luminance, color and frequency.

Multiple profiles can be constructed where each profile characterizes the noise for different device settings, exposure durations, or other parameters that might influence noise levels. For instance, noise profiles can be created for each ISO sensitivity setting of a digital camera, because noise levels can vary substantially with ISO sensitivity. Embodiments of the present invention can accommodate these additional parameters directly by, for example, indexing noise profiles according ISO setting, exposure duration or other parameter.

In some applications, a wavelet decomposition is not utilized, and noise statistics are measured directly from the original regions or from a high-pass-filtered version of each region. In this case, the noise profile can reduce a single lookup table per color channel, instead of one lookup table for each wavelet level of each channel. Even in this simplified case, embodiments of the present invention can relate noise levels to both color and tone.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed in the following claims.

What is claimed is:

1. A method for characterizing noise in an image comprising:
    loading a digital image stored in a computer readable medium;
    selecting plurality of regions of the image to analyze;
    generating a set of subbands of the image for each color channel, wherein generating a set of subbands further comprises applying a wavelet transform to the image data for the one or more regions to generate one or more sets of subband coefficients;
    analyzing image data for the regions, wherein analyzing image data for the one or more regions further comprises:
        determining based on the one or more sets of subband coefficients a set of dispersion values that comprise a plurality of dispersion values for each subband of each color channel, wherein each dispersion value corresponds to a selected region, subband and color channel;
        determining based on the set of dispersion values a set of decay pattern values indicating how noise decays from higher to lower level subbands, wherein determining the set of decay pattern values comprises dividing a first dispersion value corresponding to a first region, first color channel and first wavelet level by a second dispersion value corresponding to the first region, the first color channel and a second wavelet level to determine a first normalized dispersion value;
    generating a noise profile for the image using the dispersion values, wherein the noise profile correlates noise in a color channel to color, luminance and frequency band;
    storing the noise profile in a computer readable memory.

2. The method of claim 1, wherein the second wavelet level is a highest wavelet level for the first color channel and first region.

3. The method of claim 2, wherein each of the one or more sets of subband coefficients has a corresponding color channel, wavelet level and region and each of the dispersion values has a corresponding color channel, wavelet level and region.

4. The method of claim 3, wherein generating the noise profile further comprises:
    storing the set of dispersion values in a data structure that correlates each dispersion value to the corresponding color channel and corresponding wavelet level of that dispersion value.

5. The method of claim 4, wherein the data structure comprises a set of lookup tables.

6. The method of claim 5, wherein each of the set of dispersion values is stored in a table location based on a color tuple associated with the corresponding region for that dispersion value.

7. The method of claim 5, wherein generating the noise profile further comprises:
    storing a first set of dispersion values corresponding to a first color channel and a first wavelet level in a first table; and
    storing a second set of dispersion values corresponding to the first color channel and a second wavelet level in a second table.

8. The method of claim 7, wherein generating the noise profile further comprises:
    interpolating dispersion values for cells in the first table based on the first set of dispersion values, wherein the first table corresponds to the highest wavelet level for the first color channel.

9. The method of claim 8, wherein generating the noise profile further comprises:
- for a cell in the second table without a determined dispersion value, interpolating a decay pattern value for the cell based on a set of decay pattern values corresponding to the first color channel and second wavelet level;
- determining a highest wavelet level dispersion value for a corresponding cell in the first table;
- generating a new dispersion value for the cell in the second table based on the interpolated decay pattern value for the cell and the highest wavelet level dispersion value for the corresponding cell in the first table.

10. The method of claim 5, wherein generating the noise profile further comprises:
- storing the determined set of dispersion values in the set of one or more tables, wherein each dispersion value is stored in a table according to the corresponding wavelet level and color channel for that dispersion value and in a location corresponding to a color tuple associated with the corresponding region for that dispersion value; and
- for each location in the set of tables corresponding to a color tuple for which there is not an already determined dispersion value, interpolating a new dispersion value for that location.

11. The method of claim 10, wherein interpolating a new dispersion value for each location comprises:
- if the location for which there is not an already determined dispersion value is in a table for corresponding to the highest wavelet level, interpolating the new dispersion value for that location based on other dispersion values in the table;
- otherwise:
  - interpolating a decay pattern value for the location;
  - determining a highest wavelet level dispersion value for a corresponding location in a highest wavelet level table; and
  - generating the new dispersion value based on the decay pattern value for the location and highest wavelet level dispersion value.

12. The method of claim 1, wherein analyzing the image data further comprises applying an additional transform to the one or more sets of subband coefficients prior to measuring the set of dispersion values.

13. The method of claim 1, further comprising converting the image data to a preferred color space prior to analyzing the image data.

14. A computer program product comprising a non-transitory computer readable medium storing a set of computer instructions executable by a computer processor, the set of computer instructions comprising instructions executable to:
- access a digital image stored in a memory;
- generate a set of subbands for each color channel by applying a wavelet transform to the image data for the one or more regions to generate one or more sets of subband coefficients;
- select image data to analyze for one or more regions of the image;
- analyze the image data for the one or more regions to determine based on the one or more sets of subband coefficients a set of dispersion values that comprise a plurality of dispersion values for each subband of each color channel, wherein each dispersion value corresponds to a selected region, subband and color channel;
- determine based on the set of dispersion values a set of decay pattern values indicating how noise decays from higher to lower level subbands, wherein determining the set of decay pattern values comprises dividing a first dispersion value corresponding to a first region, first color channel and first wavelet level by a second dispersion value corresponding to the first region, the first color channel and a second wavelet level to determine a first normalized dispersion value;
- generate a noise profile for the image using the dispersion values, wherein the noise profile, jointly correlates noise in a color channel to color and luminance and frequency band; and
- store the noise profile in a computer readable memory.

15. The computer program product of claim 14, wherein the set of computer instructions further comprise instructions executable to present the digital image to a user in a graphical user interface that allows the user to select the one or more regions.

16. The computer program product of claim 14, wherein the set of computer instructions further comprise instructions executable to automatically select the one or more regions.

17. The computer program product of claim 14, wherein the second wavelet level is a highest wavelet level for the first color channel and first region.

18. The computer program product of claim 14, wherein each of the one or more sets of subband coefficients has a corresponding color channel, wavelet level and region and each of the dispersion values has a corresponding color channel, wavelet level and region.

19. The computer program product of claim 18, wherein the computer instructions executable to generate the noise profile comprise instructions executable to:
- store the set of dispersion values in a data structure that correlates each dispersion value to the corresponding color channel and corresponding wavelet level of that dispersion value.

20. The computer program product of claim 19, wherein the data structure comprises a set of lookup tables.

21. The computer program product of claim 20, wherein each of the set of dispersion values is stored in a table location based on a color tuple associated with the corresponding region for that dispersion value.

22. The computer program product of claim 20, wherein the computer instructions executable to generate the noise profile further comprise instructions executable to:
- store a first set of dispersion values corresponding to a first color channel and a first wavelet level in a first table; and
- store a second set of dispersion values corresponding to the first color channel and a second wavelet level in a second table.

23. The computer program product of claim 22, wherein the computer instructions executable to generate the noise profile further comprise instructions executable to:
- interpolate dispersion values for cells in the first table based on the first set of dispersion values, wherein the first table corresponds to the highest wavelet level for the first color channel.

24. The computer program product of claim 23, wherein the computer instructions executable to generate the noise profile further comprise instructions executable to:
- for a cell in the second table without a determined dispersion value, interpolate a decay pattern value for the cell based on a set of decay pattern values corresponding to the first color channel and second wavelet level;
- determine a highest wavelet level dispersion value for a corresponding cell in the first table;
- generate a new dispersion value for the cell in the second table based on the interpolated decay pattern value for the cell and the highest wavelet level dispersion value for the corresponding cell in the first table.

25. The computer program product of claim 20, wherein the computer instructions executable to generate the noise profile further comprise instructions executable to:
- store the determined set of dispersion values in the set of one or more tables, wherein each dispersion value is stored in a table according to the corresponding wavelet level and color channel for that dispersion value and in a location corresponding to a color tuple associated with the corresponding region for that dispersion value; and
- for each location in the set of tables corresponding to a color tuple for which there is not an already determined dispersion value, interpolate a new dispersion value for that location.

26. The computer program product of claim 25, wherein the computer instructions executable to interpolate a new dispersion value further comprise:
- if the location for which there is not an already determined dispersion value is in a table for corresponding to the highest wavelet level, interpolate the new dispersion value for that location based on other dispersion values in the table;
- otherwise:
  - interpolate a decay pattern value for the location;
  - determine a highest wavelet level dispersion value for a corresponding location in a highest wavelet level table; and
  - generate the new dispersion value based on the decay pattern value for the location and highest wavelet level dispersion value.

27. The computer program product of claim 14, wherein the computer instructions executable to analyze the image data further comprise instructions executable to apply an additional transform to the one or more sets of subband coefficients prior to determining the set of dispersion values.

28. The computer program product of claim 14, further comprising computer instructions executable to convert the image data to a preferred color space prior to analyzing the image data.

29. A system comprising a processor, a set of computer readable medium accessible by the processor and a set of computer instructions stored on the computer readable medium and executable by the computer processor, the set of computer instructions comprising instructions executable to:
- access a set of data stored in a memory containing values for a plurality of parameters for which noise is to be characterized;
- generate subbands of the set of data for each of the plurality of parameters by applying a wavelet transform to the subset data for the one or more subsets to generate one or more sets of subband coefficients;
- select subsets of data to analyze for each of the subbands;
- analyze the subset data for the one or more selected subsets to determine a set of dispersion values based on the one or more sets of subband coefficients comprising a plurality of dispersion values for each subband, wherein each dispersion value corresponds to a selected subset, subband and parameter for which noise is to be characterized;
- determine a set of decay pattern values based on the set of dispersion values for the one or more subsets that indicate how noise decays from higher to lower level subbands, wherein determining the set of decay pattern values comprises dividing a first dispersion value corresponding to a first subset, first parameter and first wavelet level by a second dispersion value corresponding to the first subset, the first parameter and a second wavelet level to determine a first normalized dispersion value;
- generate a noise profile using the dispersion values and decay pattern values, wherein the noise profile correlates noise to the one or more parameters; and
- store the noise profile in a computer readable memory.

30. The system of claim 29, wherein the set of computer instructions further comprise instructions executable to present a representation of the set of data to a user in a graphical user interface that allows the user to select the one or more subsets.

31. The system claim 29, wherein the set of computer instructions further comprise instructions executable to automatically select the one or more subsets.

32. The system of claim 29, wherein the second wavelet level is a highest wavelet level for the first color channel and first subset.

33. The system claim 29, wherein each of the one or more sets of subband coefficients has a corresponding parameter, wavelet level and subset and each of the dispersion values has a corresponding parameter, wavelet level and subset.

34. The system of claim 33, wherein the computer instructions executable to generate the noise profile comprise instructions executable to:
- store the set of dispersion values in a data structure that correlates each dispersion value to the corresponding parameter and corresponding wavelet level of that dispersion value.

35. The system of claim 34, wherein the data structure comprises a set of lookup tables.

36. The system of claim 35, wherein each of the set of dispersion values is stored in a table location based on a set of parameter values associated with the corresponding subset for that dispersion value.

37. The system of claim 35, wherein the computer instructions executable to generate the noise profile further comprise instructions executable to:
- store a first set of dispersion values corresponding to a first parameter and a first wavelet level in a first table; and
- store a second set of dispersion values corresponding to the first parameter and a second wavelet level in a second table.

38. The system of claim 37, wherein the computer instructions executable to generate the noise profile further comprise instructions executable to:
- interpolate dispersion values for cells in the first table based on the first set of dispersion values, wherein the first table corresponds to the highest wavelet level for the first parameter.

39. The system of claim 38, wherein the computer instructions executable to generate the noise profile further comprise instructions executable to:
- for a cell in the second table without a determined dispersion value, interpolate a decay pattern value for the cell based on a set of decay pattern values corresponding to the first parameter and second wavelet level;
- determine a highest wavelet level dispersion value for a corresponding cell in the first table;
- generate a new dispersion value for the cell in the second table based on the interpolated decay pattern value for the cell and the highest wavelet level dispersion value for the corresponding cell in the first table.

40. The system of claim 35, wherein the computer instructions executable to generate the noise profile further comprise instructions executable to:
- store the determined set of dispersion values in the set of one or more tables, wherein each dispersion value is stored in a table according to the corresponding wavelet level and color channel for that dispersion value and in a location corresponding to a set of parameter values associated with the corresponding subset for that dispersion value; and for each location in the set of tables corresponding to a set of parameter values for which there is not a determined dispersion value, interpolate a new dispersion value for that location.

41. The system of claim 40, wherein the computer instructions executable to interpolate a new dispersion value further comprise:

if the location for which there is not a determined dispersion value is in a table for corresponding to the highest wavelet level, interpolate the new dispersion value for that location based on other dispersion values in the table;

otherwise:

interpolate a decay pattern value for the location;

determine a highest wavelet level dispersion value for a corresponding location in a highest wavelet level table; and generate the new dispersion value based on the decay pattern value for the location and highest wavelet level dispersion value.

42. The system of claim 29, wherein the computer instructions executable to analyze the subset data further comprise instructions executable to apply an additional transform to the one or more sets of subband coefficients prior to determining the set of dispersion values.

43. The system of claim 29, further comprising computer instructions executable to convert the subset data to a preferred parameter space prior to analyzing the subset data.

44. The method of claim 1, further comprising storing the noise profile in a digital camera.

45. The computer program product of claim 14 further comprising instructions executable to store the noise profile on a digital camera.

46. The system of claim 29, further comprising a digital camera and wherein the instructions executable to store the noise profile on a digital camera.

* * * * *